US012229528B2

(12) United States Patent
Wade et al.

(10) Patent No.: US 12,229,528 B2
(45) Date of Patent: Feb. 18, 2025

(54) FUSE-BASED SEED AS AN INPUT FOR A PSEUDO-RANDOM NUMBER GENERATOR

(71) Applicant: QUALCOMM Incorporated, San Diego, CA (US)

(72) Inventors: Christopher Wade, Milton Keynes (GB); Marcel Selhorst, Zeuthen (DE)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 18/303,361

(22) Filed: Apr. 19, 2023

(65) Prior Publication Data

US 2024/0354060 A1    Oct. 24, 2024

(51) Int. Cl.
*G06F 9/4401*    (2018.01)
*G06F 7/58*    (2006.01)

(52) U.S. Cl.
CPC ............ *G06F 7/582* (2013.01); *G06F 9/4401* (2013.01)

(58) Field of Classification Search
CPC ........ G06F 9/4401; G06F 9/44; G06F 9/4403; G06F 9/4405; G06F 9/4406; G06F 9/4408; G06F 7/582; G06F 7/588; G06F 7/58
See application file for complete search history.

(56) References Cited

U.S. PATENT DOCUMENTS

| | | | |
|---|---|---|---|
| 12,081,216 B1 * | 9/2024 | Kandele | H03K 19/17768 |
| 2014/0310509 A1 * | 10/2014 | Potlapally | G06F 11/1417 713/2 |
| 2016/0179663 A1 * | 6/2016 | Roesch | G09C 1/00 711/103 |
| 2019/0129694 A1 * | 5/2019 | Benton | G06F 7/582 |
| 2019/0238329 A1 * | 8/2019 | Leara | G06F 7/58 |
| 2020/0394306 A1 * | 12/2020 | Brambilla | G06F 21/575 |

* cited by examiner

*Primary Examiner* — Raymond N Phan
(74) *Attorney, Agent, or Firm* — Polsinelli (57) ABSTRACT

Systems and techniques are provided for booting an electronic device. For example, a process can include initiating a boot procedure for the electronic device. The process can also include determining a hardware pseudo-random number generator (PRNG) is inoperable, obtaining a seed value from a read-only memory, based on the determination that the hardware PRNG is inoperable, initiating a software PRNG based on the seed value, obtaining a pseudo-random number from the software PRNG, and continuing the boot procedure using the obtained pseudo-random number.

30 Claims, 4 Drawing Sheets

FUSE-BASED SEED AS AN INPUT FOR A PSEUDO-RANDOM NUMBER GENERATOR

FIELD

Aspects of the present disclosure generally relate to device security. For example, aspects of the present disclosure relate to a fuse-based seed used as an input (e.g., as an initial input) for a pseudo random number generator (PRNG).

INTRODUCTION

Computing devices typically store sensitive data owned by users or enterprises, with firmware or operating system software on the computing devices owned by a computing device or secure module manufacturer. To help secure computing devices, the firmware or software may include security measures to protect against, e.g., removing brute force attack mitigations, disabling secure boot/trust boot, and/or loading other unauthenticated firmware or software on the computing devices.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for device security. According to at least one illustrative example, an electronic device is provided. The electronic device includes a read-only memory; a hardware pseudo-random number generator (PRNG); and at least one processor coupled to the read-only memory. The processor is configured to initiate a boot procedure for the electronic device; determine the hardware PRNG is inoperable; obtain a seed value from the read-only memory; based on the determination that the hardware PRNG is inoperable, initiate a software PRNG based on the seed value; obtain a pseudo-random number from the software PRNG; and continue the boot procedure using the obtained pseudo-random number.

In another example, a method is provided. The method includes initiating a boot procedure for the electronic device; determining a hardware pseudo-random number generator (PRNG) is inoperable; obtaining a seed value from a read-only memory; based on the determination that the hardware PRNG is inoperable, initiating a software PRNG based on the seed value; obtaining a pseudo-random number from the software PRNG; and continuing the boot procedure using the obtained pseudo-random number.

As another example, a non-transitory computer-readable medium having stored thereon instructions is provided. The instructions, when executed by a processor, cause the processor to: initiate a boot procedure for an electronic device; determine a hardware pseudo-random number generator (PRNG) is inoperable; obtain a seed value from a read-only memory; based on the determination that the hardware PRNG is inoperable, initiate a software PRNG based on the seed value; obtain a pseudo-random number from the software PRNG; and continue the boot procedure using the obtained pseudo-random number.

In another example, an apparatus for booting an electronic device is provided. The apparatus includes means for initiating a boot procedure for the electronic device; means for determining a hardware pseudo-random number generator (PRNG) is inoperable; means for obtaining a seed value from a read-only memory; based on the determination that the hardware PRNG is inoperable, means for initiating a software PRNG based on the seed value; means for obtaining a pseudo-random number from the software PRNG; and means for continuing the boot procedure using the obtained pseudo-random number.

Aspects generally include a method, apparatus, system, computer program product, non-transitory computer-readable medium, user equipment, base station, wireless communication device, and/or processing system as substantially described herein with reference to and as illustrated by the drawings and specification.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Aspects of the present disclosure address techniques to securely boot up an electronics device (e.g., a cellular phone, a personal computer, a tablet computer, a computing system of a vehicle, an extended reality (XR) device such as a virtual reality (VR) or augmented reality (AR) device, etc.). Secure boot refers to a process of loading software programs from a storage device and checking the validity of the loaded software programs. A software program may comprise software code, firmware code, or a combination of both. The secure boot techniques described herein may be used for various electronics devices such as those used for wireless communication, personal electronics, computing, networking, etc. The techniques may also be used with various storage devices having non-writable area, such as solid-state memory devices, a set of fuses, memory cards, hard disks, compact discs (CDs), etc. A non-writable area is an area of a storage device that cannot be over-written with data. The non-writable area may be a one-time programmable (OTP) area, a one-time write (OTW) area, and the like that can be programmed with data only once. The non-writable area may be used to store secure data that supports the secure boot process.

As an initial part of booting (e.g., part of a boot procedure) an electronic device, a primary bootloader may be started. As the primary bootloader is running at a time before access to other portions of the SoC, processor, and/or device has been established, the primary bootloader has access to a very limited amount of resources, such as memory areas. For example, the primary bootloader may be used start a secondary bootloader which in turn may initialize access to external memory and/or peripherals, thus, the primary bootloader is not able to access memory and/or peripherals that are later initialized. In some cases, one of the first operations of the primary bootloader is to set up stack and/or glitch protection security features. In some cases, the stack and/or glitch protection security features may use random numbers to provide for random waits and random values to prevent possible attackers from guessing values, timings, and the like. The primary bootloader may use a hardware pseudo-random number generator (PRNG) to obtain these random numbers. In some cases, a hardware PRNG may be a hybrid hardware/software random number generator. As an example, the hardware PRNG may include a hardware random number generator (RNG). A hardware RNG may refer to a hardware circuit which may generate random numbers based on a physical process which is known to have statistically random noise (e.g., entropy). The hardware RNG may accumulate this entropy, for example, by observing the physical process over time to generate random numbers. In some cases, a purely hardware random number generator may stall if asked to generate too many random numbers (or too large of a random number) until the purely hardware random number generator has accumulated a sufficient amount of entropy to generate the random numbers.

In some cases, a hardware RNG may be combined with a PRNG, for example as a hardware PRNG, to help improve performance of the hardware RNG. A PRNG may be an algorithm, implemented either in hardware or software, for generating a sequence of numbers which approximate random numbers. Output of the PRNG may appear random (e.g., statistically), but the output of the PRNG may be determined by an initial seed value. The initial seed value may be a number (or vector) that is used to initialize a PRNG. Thus, for a particular PRNG, if the PRNG is run using a particular seed value, the PRNG will output a same set of numbers. This set of numbers will appear random though. The hardware PRNG may obtain a relatively shorter initial seed from the hardware RNG and bloat the initial seed using an internal algorithm into a larger seed to use by a PRNG to generate pseudo random numbers. This relatively shorter initial seed may be faster for the hardware RNG to generate, but may still allow for a relatively larger number, which appears to be random, to be generated However, in some cases, the purely hardware random number generator can fail to deliver a random initial seed.

Systems, apparatuses, processes (also referred to as methods), and computer-readable media (collectively referred to as "systems and techniques") are described herein for providing a fuse-based seed as an input (e.g., as an initial input) for a PRNG. For example, the systems and techniques described herein can be used to provide a seed value for a software PRNG in case a hardware PRNG fails. The seed value may be stored in a memory (e.g., a read-only memory (ROM)) accessible to the bootloader.

In some cases, the memory (e.g., the ROM) may be or may include a set of fuses (e.g., electrical fuses or "eFuses"). In some examples, eFuses operate such that current will flow through an unblown eFuse, but will not flow through a blown eFuse (e.g., because the conductor material in the eFuse has failed). This allows a single eFuse to store 1 bit of information (e.g., a 1 or a 0). For instance, an unblown eFuse can represent a value of 0 and a blown eFuse can represent a value of 1. Blowing an eFuse is a one-time operation as, once blown, an eFuse cannot be unblown. In some aspects described herein, a set of eFuses may be designated to represent a seed value. In some cases, the seed value may be defined based on which fuses of the set of fuses are programmed (referred to as being "blown") and which fuses are unblown (or not yet programmed). During manufacturing, a different seed value may be set on a per chip basis.

The seed value may be input to the software PRNG to provide pseudo-random numbers for the security features to continue booting the electronic device. By using a seed value defined in the memory (e.g., the ROM), a separate seed value may be defined for each electronic device to generate different random numbers for each device. For example, if a hardware PRNG with a failed hardware RNG were to fall back to a hardware or software PRNG with single default value (or just 0), as the stack and/or glitch protection security features may be based on the numbers generated by the hardware/software PRNG, if an attacker is able to predict the pseudo random numbers generated by the hardware/software PRNG for the default seed the attacker may be able to bypass the security features for a class of devices with that hardware/software PRNG and security features. By using a different seed value for each device, even if an attacker is able to obtain the seed value and predict the pseudo random numbers generated by the hardware/software PRNG to bypass the security features for a single device, the attack would not directly work on any other devices (e.g., the attack would be limited to the single device) as the seed value would be different for different devices. Rather, to attack any other devices (other than the single device), the attacker would need to find a new set of timing information/random values to bypass security features for each device.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The term "mobile device" is used herein to refer to any one or all of cellular telephones, smartphones, Internet-of-things (IoT) devices, personal or mobile multimedia players, laptop computers, tablet computers, ultrabooks, palm-top computers, wireless electronic mail receivers, multimedia Internet enabled cellular telephones, wireless gaming controllers, smart cars, autonomous vehicles, and similar electronic devices which include a programmable processor, a memory and circuitry for sending and/or receiving wireless communication signals to/from wireless communication networks. While the various embodiments are particularly useful in mobile devices, such as smartphones and tablets, the embodiments are generally useful in any electronic device that includes secure boot circuitry for securing access to the electronic device.

Figure 1:
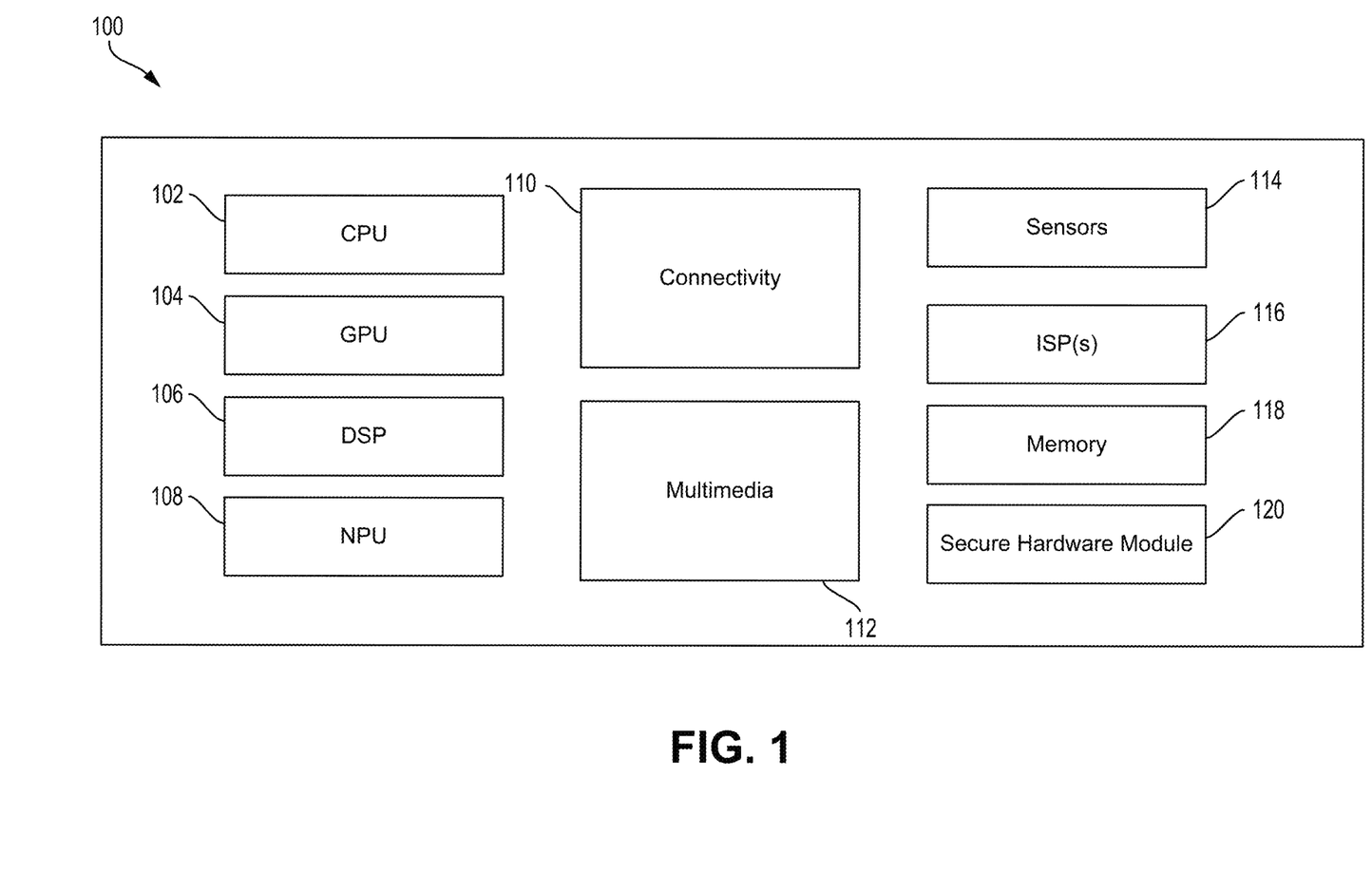
FIG. 1 illustrates an example implementation of a system-on-a-chip (SOC), in accordance with some examples.

Various aspects of the techniques described herein will be discussed below with respect to the figures. FIG. 1. FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

In some cases, the SOC 100 may be based on an ARM instruction set. The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or a secure hardware module 120. The secure hardware module 120 may include fuses, replay protected memory block (RPMB), eFuses, hardware random number generator(s) (RNGs), hardware pseudo-random number generator(s) (PRNGs), secure bits, secure flags, security enabled hardware, secure memory, or hardware, software, or firmware used to implement a secure portion of the operating system, a secure operating system (SOS), a trusted execution environment (TEE), etc.

In some cases, device manufacturers may equip their devices with secure boot features that could be used to prevent criminals and nefarious actors from using flashing tools, OEM over-the-air software updates, or other similar technologies to install unauthorized or unauthenticated software images on the device.

Figure 2:
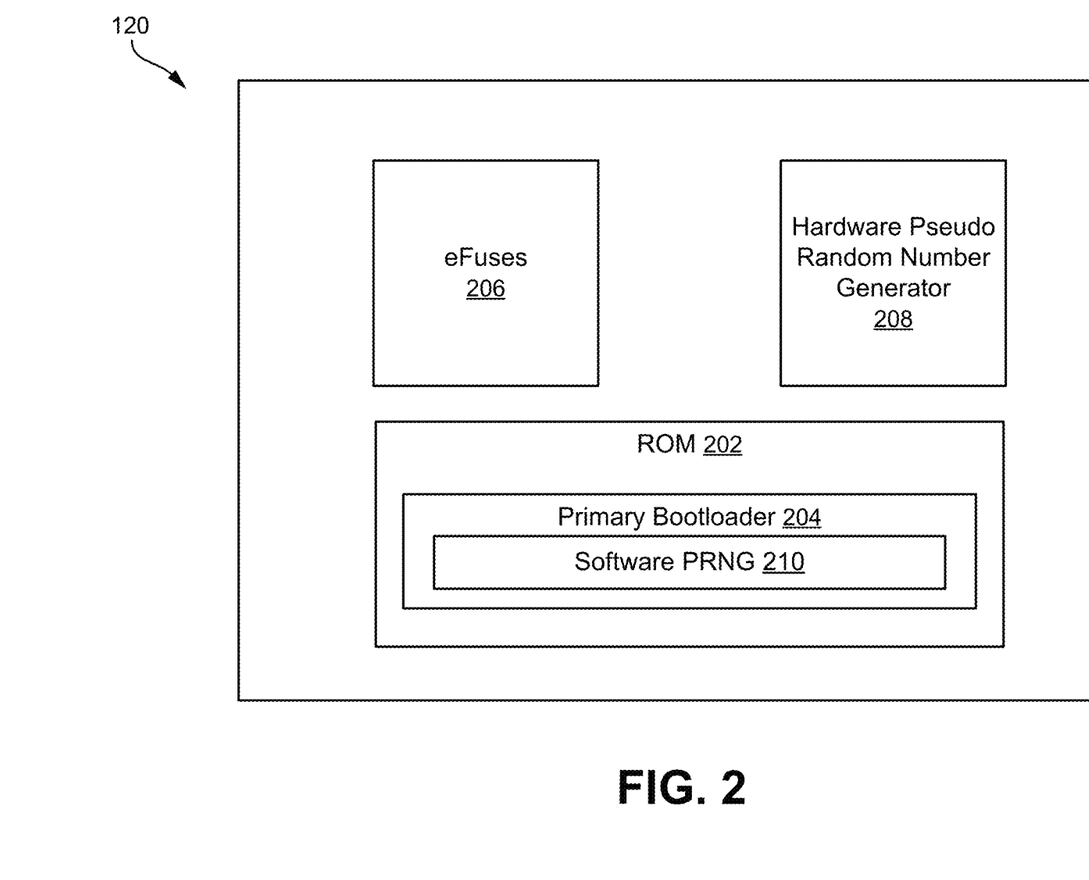
FIG. 2 is a block diagram illustrating an example secure hardware module for performing secure boot, in accordance with aspects of the present disclosure, in accordance with some examples.

FIG. 2 is a block diagram illustrating an example secure hardware module 120 for performing secure boot, in accordance with aspects of the present disclosure. Secure boot may be a security feature where each software image in a boot sequence is authenticated by a different previously verified software image. As such, secure boot builds a chain of trust, starting with a first piece of software that operates from non-volatile storage or read-only-memory (ROM) 202. The first piece of software, which in certain software architectures is referred to as the first ROM bootloader or a primary bootloader (PBL) 204, verifies a signature of the next bootloader in the chain, which may, in turn, cryptographically verify the signature of the next software image, which may be a feature-rich application bootloader that is specific to the operating system that will subsequently be loaded on the mobile device. These operations may be repeated until all the of software images in the boot sequence, and the operating system, are evaluated, installed, discarded, loaded or executed on the mobile device.

In some cases, software images in the boot sequence may be Executable and Linkable Format (ELF) software images that includes a certificate chain. An attestation certificate may be lowest level certificate authorizing the signature of the ELF software image, and may be signed by the attestation CA certificate, which may in turn be signed by the root CA certificate. The root CA certificate may be validated by comparing a hash of the root CA certificate to values stored in eFuses 206, which are hardware embedded one-time programmable bits (e.g., fuses) that once "blown" cannot be readily reverted to an "unblown" state. Generally, the root CA hash value may only be written in the eFuses by the OEM/ODM as a part of a manufacturing process (e.g., during configuration, testing, etc.). This provides the OEM/ODM significant control over the mobile device's cryptographic root of trust and helps ensure that unauthorized or unauthenticated software images are not installed on the mobile device. The eFuses 206 may be considered a type of ROM.

In some cases, the bootloader may also use a hardware PRNG 208 to generate random numbers to help ensure security of an execution stack of the primary bootloader 204 and protect against glitches. For example, the execution stack of the primary bootloader 204 may include a stack canary which can be a random value that may be inserted within data being executed. If an attacker attempts to overwrite portions of the execution stack, the canary value may be changed, indicating that the secure hardware module 120 may be under attack. As another example, during execution of the primary bootloader 204 instructions, randomly long waits may be inserted after a data check. After the wait, the data check may be performed again to see if the value remains the same and that there have not been any power drops/spikes after the first check. This helps ensure that an attacker cannot physically change or measure the data values and the random timing helps prevent automation of attacks.

In some cases, the hardware PRNG 208 may ensure that a pseudo random number can be generated. However, in some cases, the hardware PRNG 208 can fail. In some cases, the primary bootloader 204 may include a software PRNG 210 for generating pseudo random numbers for stack and glitch protection in case the hardware PRNG 208 fails. In some cases, a software PRNG may be a PRNG implemented in software. In some cases, the hardware PRNG 208 may be determined to be inoperable (e.g., has failed) if the hardware PRNG 208 fails to output a requested random number within a certain amount of time, or if the output is invalid. For example, if the primary bootloader 204 attempts to obtain a random number from the hardware PRNG 208 to setup the stack canary and the hardware PRNG 208 fails to return (e.g., respond with) a number within a certain amount of time (e.g., a time threshold), the primary bootloader 204 may determine that the hardware PRNG 208 has failed (e.g., is inoperable). This time threshold may range from nanoseconds to several seconds and the time threshold may be set based on how fast the hardware PRNG 208 is expected to produce output in normal operations. As another example, if the primary bootloader 204 attempts to obtain a random number from the hardware PRNG 208 and obtains a number corresponding to the number that is expected (expected number) from a default seed value (e.g., if the seed is 0), then the primary bootloader 204 may determine that the hardware PRNG 208 has failed (e.g., is inoperable). Based on a determination that the hardware PRNG 208 has failed, the primary bootloader 204 may start a software PRNG 210 to obtain the random number for setting up the stack canary and continuing the boot process. It may be understood that while discussed in the context of a software based PRNG 210, the software PRNG 210 may be implemented as a hardware component that may operate independently from the hardware PRNG 208.

In some cases, the software PRNG 210 may use a seed number to initialize the software PRNG 210. This seed number should be different for different secure hardware modules. As an example, in some cases, for identically programmed PRNGs, if the PRNGs are initialized based on the same seed number, then the PRNGs will produce the same sequence of numbers. If a set of secure hardware modules with the same PRNG are initialized with the same hardcoded seed value, then all of PRNGs will produce the same number sequence. Thus, any attack that can bypass the protections that use the pseudo random numbers produced by the PRNG on one of the secure hardware modules will work on all of the secure hardware modules of the set of secure hardware modules. Thus, different seed numbers should be used for the software PRNG 210 for different secure hardware modules.

Where different seed numbers are used for the software PRNG 210, even if an attacker can bypass the protections that use the pseudo random numbers produced by the PRNG, the bypass would be limited to a single secure hardware module 120. Other secure hardware modules would have a different seed and thus different randomly generated protections (e.g., random timings, random stack canaries, etc.).

In some cases, different seed values may be encoded in the software PRNG 210, for example during manufacturing. However, as indicated above, for secure boot, the software PRNG 210 should be signed with a certificate, either as a part of the primary bootloader 204 software or stand alone. Any changes to the software PRNG 210, such as to change seed values, may result in a new certificate to be issued. Managing the certificates for a large number of secure hardware modules or primary bootloaders may be logistically challenging. Similarly, storing the seed value directly in a memory, such as the ROM 202 may add manufacturing costs as different secure hardware modules would need a different image for flashing the ROM 202. Additionally, as the software PRNG 210 may be used as by the primary bootloader 204, the software PRNG 210 may be executing at a time before access to other portions of the SoC, processor, and/or device has been established. For example, the primary bootloader 204 may start a secondary bootloader which in turn may initialize access to external memory and/or peripherals. Thus, the memory available to the primary bootloader 204 is fairly limited. Additionally, in some cases, it can be easier to extract data from memory, such as ROM 202 as compared to eFuses 206 as access to eFuses 206 is relatively limited.

In some cases, to avoid including the seed value in the software PRNG 210 or ROM 202, the seed value may be encoded in the eFuses 206. As indicated above, the eFuses 206 include one-time programmable bits. In some cases, the eFuses 206 may be used to store cryptographic signatures as well as cryptographic keys. In some cases, as the cryptographic keys may be different for each set of eFuses 206, there may be existing support for blowing a random set of bits (e.g., fuses) of the set of eFuses 206 to store a random seed value for the software PRNG 210, for example, during manufacturing. In some cases, the eFuses 206 for the seed value may be designated (e.g., fuses 1-33 are set in advance to store the seed value) and read out to a bit value (e.g., variable), such as a 32-bit value.

For example, a set of fuses, such as fuses 1-33, may be designated for storing the seed value and these fuses would be read out. In some cases, blown fuses may be read out as ones and unblown fuses may be read as zeros (or vice versa). This variable may be input to the software PRNG 210 as the seed value. The software PRNG 210 may use the input seed value to generate a series of pseudo random numbers as requested, for example, by the primary bootloader 204 when the hardware PRNG 208 is not operable. These generated random numbers may be used for the stack and glitch protection security features, such as the stack canary or random waits.

Figure 3:
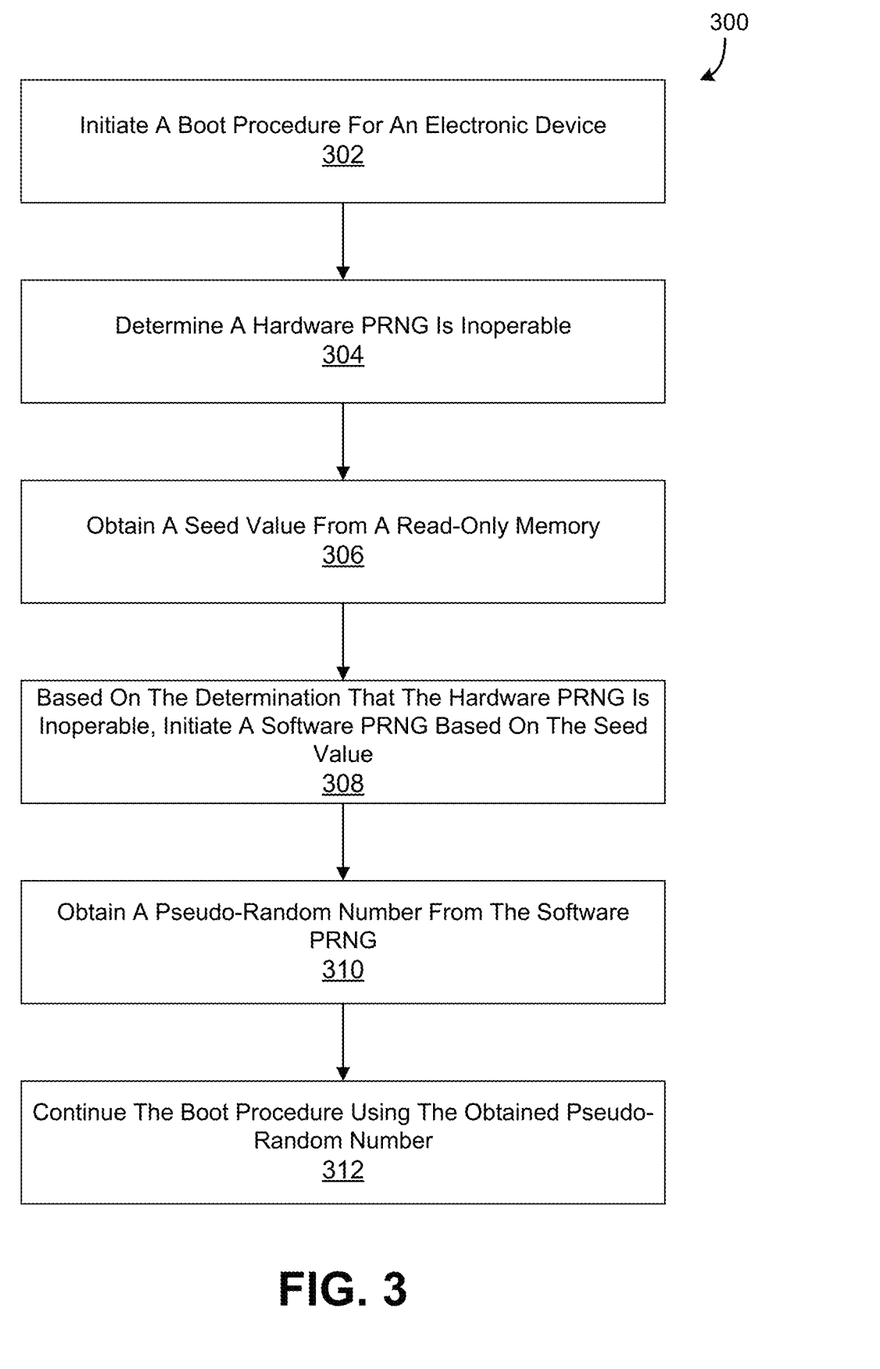
FIG. 3 is flow diagram illustrating an example of a process for booting an electronic device, in accordance with some examples.

FIG. 3 is a flow diagram illustrating an example of a process 300 for booting an electronic device. The process 300 may be performed by a wireless device or by a component (e.g., SOC 100 of FIG. 1, processor 410 of FIG. 4) or system (e.g., a chipset) of the wireless device (e.g., computing system 400). The electronic device may be a wireless device, such as computing system 400, or a UE (e.g., a mobile device such as a mobile phone, a network-connected wearable such as a watch, an extended reality device such as a virtual reality (VR) device or augmented reality (AR) device, a vehicle or component or system of a vehicle, or other type of UE) or other type of network node. In some examples, the process 300 may be performed by a UE. The operations of the process 300 may be implemented, in part, as software components that are executed and run on one or more processors (e.g., CPU 102 of FIG. 1, processor 410 of FIG. 4 or other processor(s)).

At block 302, the computing device (or component thereof) may initiate a boot procedure for an electronic device.

At block 304, the computing device (or component thereof) may determine a hardware PRNG is inoperable. In some cases, the computing device (or component thereof) may determine the hardware PRNG is inoperable if the hardware PRNG has not responded within a time threshold. In some cases, the computing device (or component thereof) may determine the hardware PRNG is inoperable if a number returned by the hardware PRNG corresponds to an expected number from the hardware PRNG using a default seed value.

At block 306, the computing device (or component thereof) may obtain a seed value from the read-only memory. In some cases, the seed value is set during a manufacturing process. In some examples, the seed value is set as a random number or pseudo random number. In some cases, the read-only memory comprises a set of fuses. In some examples, the set of fuses corresponding to the seed value are designated for storing the seed value. In some cases, blown fuses of the set of fuses correspond to a first binary number. In some examples, unblown fuses of the set of fuses correspond to a second binary number.

At block 308, the computing device (or component thereof) may, based on the determination that the hardware PRNG is inoperable, initiate a software PRNG based on the seed value.

At block 310, the computing device (or component thereof) may obtain a pseudo-random number from the software PRNG. In some cases, the pseudo-random number is used as a part of a security feature of the boot procedure.

At block 312, the computing device (or component thereof) may continue the boot procedure using the obtained pseudo-random number.

In some examples, the processes described herein (e.g., process 300, and/or other process described herein) may be performed by a computing device or apparatus (e.g., a network node such as a UE, base station, a portion of a base station, etc.). For example, as noted above, one or more of the processes described herein (e.g., the process 800, and/or other process described herein) may be performed by a UE.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 300 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, process 300 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 4:
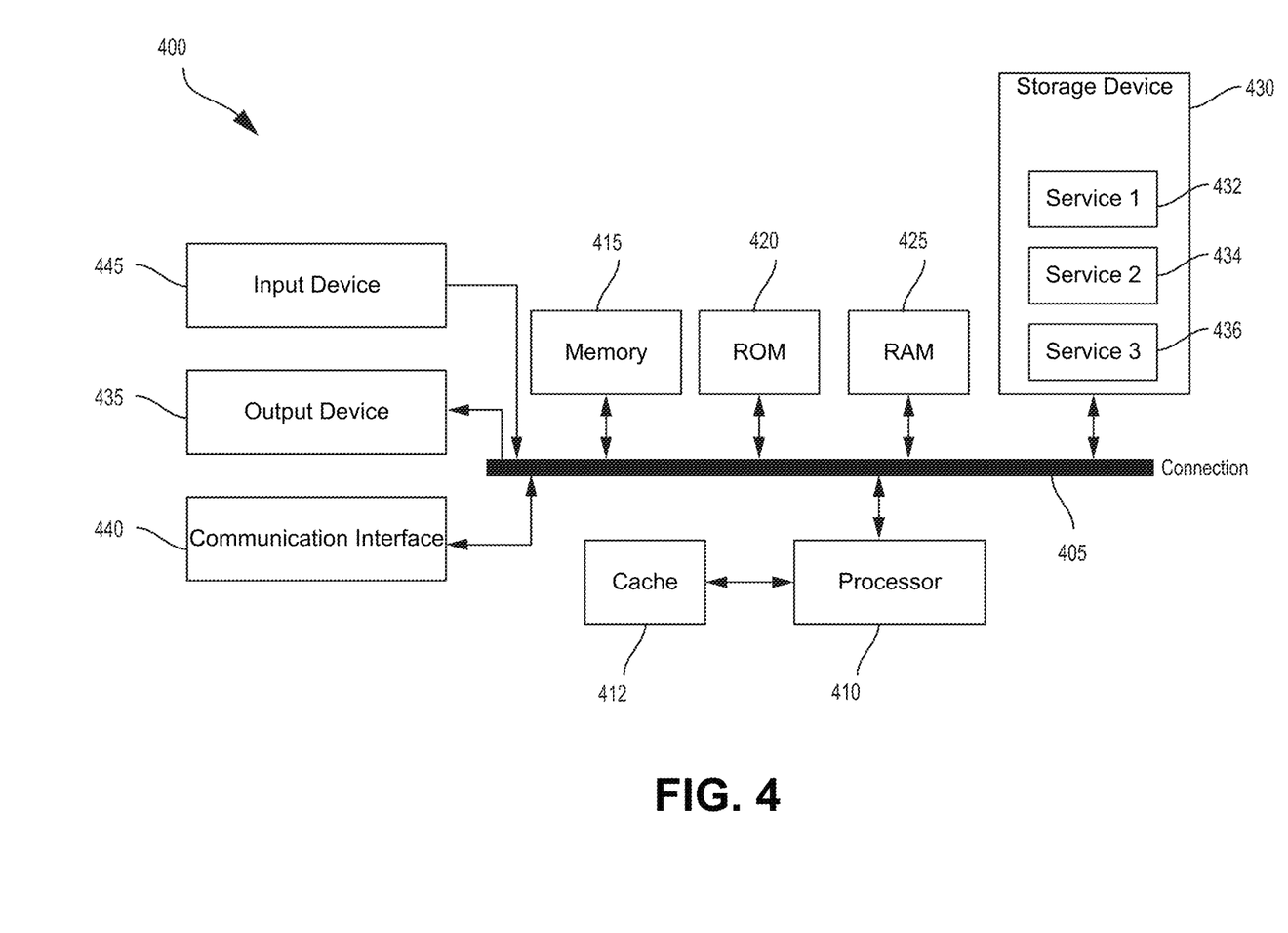
FIG. 4 is a block diagram illustrating an example of a computing system, in accordance with some examples.

FIG. 4 is a diagram illustrating an example of a system for implementing certain aspects of the present technology. In particular, FIG. 4 illustrates an example of computing system 400, which may be for example any computing device making up internal computing system, a remote computing system, a camera, or any component thereof in which the components of the system are in communication with each other using connection 405. Connection 405 may be a physical connection using a bus, or a direct connection into processor 410, such as in a chipset architecture. Connection 405 may also be a virtual connection, networked connection, or logical connection.

In some aspects, computing system 400 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 400 includes at least one processing unit (CPU or processor) 410 and connection 405 that communicatively couples various system components including system memory 425, such as read-only memory (ROM) 420 and random access memory (RAM) 425 to processor 410. Computing system 400 may include a cache 415 of high-speed memory connected directly with, in close proximity to, or integrated as part of processor 410.

Processor 410 may include any general-purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which may represent any number of input mechanisms, such as a microphone for speech, a touch-sensitive screen for gesture or graphical input, keyboard, mouse, motion input, speech, etc. Computing system 400 may also include output device 435, which may be one or more of a number of output mechanisms. In some instances, multimodal systems may enable a user to provide multiple types of input/output to communicate with computing system 400.

Computing system 400 may include communications interface 440, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 440 may also include one or more Global Navigation Satellite System (GNSS) receivers or transceivers that are used to determine a location of the computing system 400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 430 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 430 may include software services, servers, services, etc., that when the code that defines such software is executed by the processor 410, it causes the system to perform a function. In some aspects, a hardware service that performs a particular function may include the software component stored in a computer-readable medium in connection with the necessary hardware components, such as processor 410, connection 405, output device 435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B. C. or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A. B. or A and B, and may additionally include items not listed in the set of A and B.

Illustrative aspects of the disclosure include:

Aspect 1. An electronic device, comprising: a read-only memory; a hardware pseudo-random number generator (PRNG); and at least one processor coupled to the read-only memory, the at least one processor configured to: initiate a boot procedure for the electronic device; determine the hardware PRNG is inoperable; obtain a seed value from the read-only memory; based on the determination that the hardware PRNG is inoperable, initiate a software PRNG based on the seed value; obtain a pseudo-random number from the software PRNG; and continue the boot procedure using the obtained pseudo-random number.

Aspect 2. The electronic device of Aspect 1, wherein the seed value is set during a manufacturing process.

Aspect 3. The electronic device of Aspect 2, wherein the seed value is set as a random number or pseudo random number.

Aspect 4. The electronic device of Aspect 1, wherein the read-only memory comprises a set of fuses.

Aspect 5. The electronic device of Aspect 4, wherein the set of fuses corresponding to the seed value are designated for storing the seed value.

Aspect 6. The electronic device of Aspect 4, wherein blown fuses of the set of fuses correspond to a first binary number and wherein unblown fuses of the set of fuses correspond to a second binary number.

Aspect 7. The electronic device of Aspect 1, wherein, to determine the hardware PRNG is inoperable, the at least one processor is configured to determine that the hardware PRNG has not responded within a time threshold.

Aspect 8. The electronic device of Aspect 1, wherein, to determine the hardware PRNG is inoperable, the at least one processor is configured to determine that a number returned by the hardware PRNG corresponds to an expected number from the hardware PRNG using a default seed value.

Aspect 9. The electronic device of Aspect 1, wherein the pseudo-random number is used as a part of a security feature of the boot procedure.

Aspect 10. A method for booting an electronic device, comprising: initiating a boot procedure for the electronic device; determining a hardware pseudo-random number generator (PRNG) is inoperable; obtaining a seed value from a read-only memory; based on the determination that the hardware PRNG is inoperable, initiating a software PRNG based on the seed value; obtaining a pseudo-random number from the software PRNG; and continuing the boot procedure using the obtained pseudo-random number.

Aspect 11. The method of Aspect 10, wherein the seed value is set during a manufacturing process.

Aspect 12. The method of Aspect 11, wherein the seed value is set as a random number or pseudo random number.

Aspect 13. The method of Aspect 10, wherein the read-only memory comprises a set of fuses.

Aspect 14. The method of Aspect 13, wherein the set of fuses corresponding to the seed value are designated for storing the seed value.

Aspect 15. The method of Aspect 13, wherein blown fuses of the set of fuses correspond to a first binary number and wherein unblown fuses of the set of fuses correspond to a second binary number.

Aspect 16. The method of Aspect 10, wherein determining the hardware PRNG is inoperable comprises determining that the hardware PRNG has not responded within a time threshold.

Aspect 17. The method of Aspect 10, wherein determining the hardware PRNG is inoperable comprises determining that a number returned by the hardware PRNG corresponds to an expected number from the hardware PRNG using a default seed value.

Aspect 18. The method of Aspect 10, wherein the pseudo-random number is used as a part of a security feature of the boot procedure.

Aspect 19. A non-transitory computer-readable medium having stored thereon instructions that, when executed by a processor, causes the processor to: initiate a boot procedure for an electronic device; determine a hardware pseudo-random number generator (PRNG) is inoperable; obtain a seed value from a read-only memory; based on the determination that the hardware PRNG is inoperable, initiate a software PRNG based on the seed value; obtain a pseudo-random number from the software PRNG; and continue the boot procedure using the obtained pseudo-random number.

Aspect 20. The non-transitory computer-readable medium of Aspect 19, wherein the seed value is set during a manufacturing process.

Aspect 21. The non-transitory computer-readable medium of Aspect 20, wherein the seed value is set as a random number or pseudo random number.

Aspect 22. The non-transitory computer-readable medium of Aspect 19, wherein the read-only memory comprises a set of fuses.

Aspect 23. The non-transitory computer-readable medium of Aspect 22, wherein the set of fuses corresponding to the seed value are designated for storing the seed value.

Aspect 24. The non-transitory computer-readable medium of Aspect 22, wherein blown fuses of the set of fuses correspond to a first binary number and wherein unblown fuses of the set of fuses correspond to a second binary number.

Aspect 25. The non-transitory computer-readable medium of Aspect 19, wherein, to determine the hardware PRNG is inoperable, the instructions cause the processor to determine that the hardware PRNG has not responded within a time threshold.

Aspect 26. The non-transitory computer-readable medium of Aspect 19, wherein, to determine the hardware PRNG is inoperable, the instructions cause the processor to determine that a number returned by the hardware PRNG corresponds to an expected number from the hardware PRNG using a default seed value.

Aspect 27. The non-transitory computer-readable medium of Aspect 19, wherein the pseudo-random number is used as a part of a security feature of the boot procedure.

Aspect 28. An apparatus for booting an electronic device, comprising: means for initiating a boot procedure for the electronic device; means for determining a hardware pseudo-random number generator (PRNG) is inoperable; means for obtaining a seed value from a read-only memory; based on the determination that the hardware PRNG is inoperable, means for initiating a software PRNG based on the seed value; means for obtaining a pseudo-random number from the software PRNG; and means for continuing the boot procedure using the obtained pseudo-random number.

Aspect 29. The apparatus of Aspect 28, wherein the seed value is set during a manufacturing process.

Aspect 30. The apparatus of Aspect 28, wherein the seed value is set as a random number or pseudo random number.

Aspect 31. An apparatus for wireless communications, comprising one or more means for performing operations according to any of Aspects 10 to 18.

What is claimed is:

1. An electronic device, comprising:
   a read-only memory;
   a hardware pseudo-random number generator (PRNG); and
   at least one processor coupled to the read-only memory, the at least one processor configured to:
   initiate a boot procedure for the electronic device;
   determine the hardware PRNG is inoperable;
   obtain a seed value from the read-only memory;
   based on the determination that the hardware PRNG is inoperable, initiate a software PRNG based on the seed value;
   obtain a pseudo-random number from the software PRNG; and
   continue the boot procedure using the obtained pseudo-random number.

2. The electronic device of claim 1, wherein the seed value is set during a manufacturing process.

3. The electronic device of claim 1, wherein the read-only memory comprises a set of fuses.

4. The electronic device of claim 1, wherein, to determine the hardware PRNG is inoperable, the at least one processor is configured to determine that the hardware PRNG has not responded within a time threshold.

5. The electronic device of claim 1, wherein, to determine the hardware PRNG is inoperable, the at least one processor is configured to determine that a number returned by the hardware PRNG corresponds to an expected number from the hardware PRNG using a default seed value.

6. The electronic device of claim 1, wherein the pseudo-random number is used as a part of a security feature of the boot procedure.

7. The electronic device of claim 2, wherein the seed value is set as a random number or pseudo random number.

8. The electronic device of claim 3, wherein the set of fuses corresponding to the seed value are designated for storing the seed value.

9. The electronic device of claim 3, wherein blown fuses of the set of fuses correspond to a first binary number and wherein unblown fuses of the set of fuses correspond to a second binary number.

10. A method for booting an electronic device, comprising:
    initiating a boot procedure for the electronic device;
    determining a hardware pseudo-random number generator (PRNG) is inoperable;

obtaining a seed value from a read-only memory;
based on the determination that the hardware PRNG is inoperable, initiating a software PRNG based on the seed value;
obtaining a pseudo-random number from the software PRNG; and
continuing the boot procedure using the obtained pseudo-random number.

11. The method of claim 10, wherein the seed value is set during a manufacturing process.

12. The method of claim 10, wherein the read-only memory comprises a set of fuses.

13. The method of claim 10, wherein determining the hardware PRNG is inoperable comprises determining that the hardware PRNG has not responded within a time threshold.

14. The method of claim 10, wherein determining the hardware PRNG is inoperable comprises determining that a number returned by the hardware PRNG corresponds to an expected number from the hardware PRNG using a default seed value.

15. The method of claim 10, wherein the pseudo-random number is used as a part of a security feature of the boot procedure.

16. The method of claim 11, wherein the seed value is set as a random number or pseudo random number.

17. The method of claim 12, wherein the set of fuses corresponding to the seed value are designated for storing the seed value.

18. The method of claim 12, wherein blown fuses of the set of fuses correspond to a first binary number and wherein unblown fuses of the set of fuses correspond to a second binary number.

19. A non-transitory computer-readable medium having stored thereon instructions that, when executed by a processor, causes the processor to:
initiate a boot procedure for an electronic device;
determine a hardware pseudo-random number generator (PRNG) is inoperable;
obtain a seed value from a read-only memory;
based on the determination that the hardware PRNG is inoperable, initiate a software PRNG based on the seed value;
obtain a pseudo-random number from the software PRNG; and
continue the boot procedure using the obtained pseudo-random number.

20. The non-transitory computer-readable medium of claim 19, wherein the seed value is set during a manufacturing process.

21. The non-transitory computer-readable medium of claim 19, wherein the read-only memory comprises a set of fuses.

22. The non-transitory computer-readable medium of claim 19, wherein, to determine the hardware PRNG is inoperable, the instructions cause the processor to determine that the hardware PRNG has not responded within a time threshold.

23. The non-transitory computer-readable medium of claim 19, wherein, to determine the hardware PRNG is inoperable, the instructions cause the processor to determine that a number returned by the hardware PRNG corresponds to an expected number from the hardware PRNG using a default seed value.

24. The non-transitory computer-readable medium of claim 19, wherein the pseudo-random number is used as a part of a security feature of the boot procedure.

25. The non-transitory computer-readable medium of claim 20, wherein the seed value is set as a random number or pseudo random number.

26. The non-transitory computer-readable medium of claim 21, wherein the set of fuses corresponding to the seed value are designated for storing the seed value.

27. The non-transitory computer-readable medium of claim 21, wherein blown fuses of the set of fuses correspond to a first binary number and wherein unblown fuses of the set of fuses correspond to a second binary number.

28. An apparatus for booting an electronic device, comprising:
means for initiating a boot procedure for the electronic device;
means for determining a hardware pseudo-random number generator (PRNG) is inoperable;
means for obtaining a seed value from a read-only memory;
based on the determination that the hardware PRNG is inoperable, means for initiating a software PRNG based on the seed value;
means for obtaining a pseudo-random number from the software PRNG; and
means for continuing the boot procedure using the obtained pseudo-random number.

29. The apparatus of claim 28, wherein the seed value is set during a manufacturing process.

30. The apparatus of claim 28, wherein the seed value is set as a random number or pseudo random number.

* * * * *